(12) United States Patent
Kim

(10) Patent No.: US 7,802,284 B2
(45) Date of Patent: Sep. 21, 2010

(54) METHOD FOR TRANSMITTING AND RECEIVING AUDIO IN MOSAIC EPG SERVICE

(75) Inventor: Jong Soon Kim, Seoul (KR)

(73) Assignee: Humax Co., Ltd., Kyonggi-Do (KR)

( * ) Notice: Subject to any disclaimer, the term of this patent is extended or adjusted under 35 U.S.C. 154(b) by 1647 days.

(21) Appl. No.: 10/871,057

(22) Filed: Jun. 21, 2004

(65) Prior Publication Data

US 2005/0028203 A1    Feb. 3, 2005

(30) Foreign Application Priority Data

Jun. 21, 2003    (KR) .................. 10-2003-0040462

(51) Int. Cl.
*H04N 5/445* (2006.01)
(52) U.S. Cl. .................... 725/44; 725/38; 725/54; 725/98; 725/118; 381/306
(58) Field of Classification Search ............ 381/17–23, 381/306, 307
See application file for complete search history.

(56) References Cited

U.S. PATENT DOCUMENTS

| | | | | |
|---|---|---|---|---|
| 3,746,792 | A * | 7/1973 | Scheiber | 381/23 |
| 5,633,683 | A * | 5/1997 | Rosengren et al. | 348/564 |
| 6,084,970 | A * | 7/2000 | Aarts et al. | 381/17 |
| 6,118,498 | A * | 9/2000 | Reitmeier | 375/240.26 |
| 6,493,291 | B2 * | 12/2002 | Nagano | 381/2 |
| 6,539,545 | B1 * | 3/2003 | Dureau et al. | 375/E7.024 |
| 6,650,755 | B2 * | 11/2003 | Vaudrey et al. | 381/307 |
| 7,051,359 | B2 * | 5/2006 | Kim et al. | 375/E7.024 |
| 7,174,512 | B2 * | 2/2007 | Martin et al. | 348/E5.105 |
| 2002/0056099 | A1 | 5/2002 | Takahashi et al. | |
| 2002/0067376 | A1 * | 6/2002 | Martin et al. | 345/810 |
| 2002/0184628 | A1 | 12/2002 | Kim et al. | |
| 2003/0014752 | A1 * | 1/2003 | Zaslavsky et al. | 725/38 |
| 2003/0035553 | A1 * | 2/2003 | Baumgarte et al. | 381/94.2 |
| 2003/0059066 | A1 * | 3/2003 | Kohyama et al. | 381/119 |
| 2004/0194137 | A1 * | 9/2004 | Shreesha | 725/41 |

FOREIGN PATENT DOCUMENTS

| | | |
|---|---|---|
| EP | 1 073 270 A1 | 1/2001 |
| EP | 1 113 435 B1 | 7/2001 |
| EP | 1 193 970 A2 | 4/2002 |
| WO | WO-96/13120 A1 | 5/1996 |

* cited by examiner

*Primary Examiner*—Brian T Pendleton
*Assistant Examiner*—Dika C. Okeke
(74) *Attorney, Agent, or Firm*—Birch, Stewart, Kolasch & Birch, LLP

(57) ABSTRACT

Disclosed is a method for transmitting and receiving audio in a Mosaic electronic program guide (EPG) service. A digital broadcast transmitting side mixes stereo audio signals corresponding to each sub-picture within a Mosaic EPG picture and encodes mono audio signals corresponding to odd and even-numbered sub-pictures into one stereo audio signal. The digital broadcast transmitting side transmits the stereo audio signal based on a result of the encoding through the Mosaic EPG service. Therefore, the method can efficiently transmit audio of a sub-picture within the Mosaic EPG picture, and can minimize bandwidth necessary for transmitting audio of sub-pictures within the Mosaic EPG picture. A user can confirm and select a desired broadcast program while listening to audio corresponding to a sub-picture within the Mosaic EPG picture, thereby conveniently using the desired broadcast program.

7 Claims, 6 Drawing Sheets

METHOD FOR TRANSMITTING AND RECEIVING AUDIO IN MOSAIC EPG SERVICE

This Nonprovisional application claims priority under 35 U.S.C. §119(a) on Patent Application No(s). 03-40462 filed in Republic of KOREA on Jun. 21, 2003, the entire contents of which are hereby incorporated by reference.

BACKGROUND OF THE INVENTION

1. Field of the Invention

The present invention relates to a method for transmitting and receiving audio in a Mosaic electronic program guide (EPG) service, and more particularly to a method for efficiently transmitting and receiving audio linked to each sub-picture provided through a Mosaic electronic program guide (EPG) service.

2. Description of the Related Art

Recently, an electronic program guide (EPG) service is being commercialized to provide various types of broadcast program information. Moreover, a digital broadcast receiver such as a set-top box (STB) receives EPG information and outputs the received EPG information through a screen of an external display unit such as a television (TV), such that a user can easily search for desired broadcast program information.

The Mosaic EPG service is being carried out in order for the user to easily search for and select various broadcast programs provided through different broadcast services. The Mosaic EPG service will be described in detail.

FIG. 1 is a block diagram illustrating transmitting and receiving sides for transmitting and receiving a conventional Mosaic electronic program guide (EPG) service. A transmitting side 100 comprises a Mosaic screen generator 10, an encoder 11, a multiplexer (MUX) & modulator 12, an up-linker 13 and a Mosaic information generator 14.

The Mosaic screen generator 10 generates a Mosaic screen so that various broadcast programs BS 1 to BS k provided through different broadcast services can be displayed as small-sized sub-pictures within one screen. The encoder 11 encodes the Mosaic screen into a Moving Picture Experts Group (MPEG) data stream appropriate for digital broadcast. Moreover, the MUX & modulator 12 multiplexes and modulates Mosaic information generated by the Mosaic information generator 14 and the MPEG data stream based on the encoding, and outputs a result of the multiplexing and modulation to a broadcast satellite 200 via the up-linker 13.

A digital broadcast receiver 400 such as a set-top box (STB) outputs the Mosaic EPG picture received from the broadcast satellite 200 through a screen of the TV 500.

For example, the Mosaic EPG picture can include $1^{st}$ to $9^{th}$ sub-pictures 1 to 9 corresponding to $1^{st}$ to $9^{th}$ programs 1 to 9 provided through different broadcast services within an identical screen as shown in FIG. 2.

When a selection button provided in a remote controller (not shown) or etc. is clicked in a state where the user places a cursor on one arbitrary sub-picture included in the Mosaic EPG picture, for example, in a state where the cursor is placed on the $1^{st}$ sub-picture, the digital broadcast receiver 400 refers to the Mosaic information provided through the Mosaic EPG service, selects a broadcast service providing the $1^{st}$ broadcast program corresponding to the $1^{st}$ sub-picture, and outputs the $1^{st}$ broadcast program received through the broadcast service to a main picture screen.

Thus, the user of the digital broadcast receiver can simultaneously search for various broadcast programs provided by different broadcast services through the Mosaic EPG picture, and can easily select or designate one arbitrary broadcast service.

The user of the digital broadcast receiver visually confirms a broadcast program through a sub-picture included in the Mosaic EPG picture and then selects a desired broadcast program according to a result of the confirmation. Moreover, the user may desire to listen to audio of the broadcast program corresponding to each sub-picture when selecting the desired broadcast program. That is, it is necessary that audio of each of the broadcast programs corresponding to the sub-pictures included in the Mosaic EPG picture be provided through the Mosaic EPG service. However, a method for efficiently providing audio of the broadcast programs in the Mosaic EPG picture is not provided.

SUMMARY OF THE INVENTION

Therefore, the present invention has been made in view of the above problems, and it is one object of the present invention to provide a method for efficiently transmitting and receiving audio linked to each sub-picture in a Mosaic electronic program guide (EPG) service.

It is another object of the present invention to provide a method for allowing a user to easily select a desired broadcast program while he or she listens to audio linked to each sub-picture in a Mosaic electronic program guide (EPG) service.

In accordance with one aspect of the present invention, the above and other objects can be accomplished by the provision of a method for transmitting audio in a Mosaic electronic program guide (EPG) service, comprising; combining a predetermined number of sub-pictures within a Mosaic EPG picture in one unit and encoding audio signals of broadcast programs corresponding to the predetermined number of sub-pictures into one audio signal; and transmitting the one audio signal through the Mosaic EPG service. Here, when an audio system of the broadcast programs is a 2-channel stereo system, audio of an odd-numbered sub-picture and audio of an even-numbered sub-picture are encoded into one piece of 2-channel audio data. A unique audio packet identification (ID) is additionally recorded on a header of the audio data. In order that audio data corresponding to a selected sub-picture can be searched for, navigation information is added to program map table (PMT) information in which the unique audio packet ID is mapped to each sub-picture. The navigation information is transmitted through the Mosaic EPG service.

In accordance with another aspect of the present invention, the above and other objects can be accomplished by the provision of a method for receiving audio in a Mosaic electronic program guide (EPG) service, comprising; confirming an audio packet identification (ID) of a broadcast program corresponding to one arbitrary sub-picture on which a cursor is placed within a Mosaic EPG picture; selectively extracting only audio data on which the confirmed audio packet ID is additionally recorded; and decoding the extracted audio data, separating partial audio data corresponding to the sub-picture from the decoded audio data and outputting the separated partial audio data.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Hereinafter, a method for transmitting and receiving audio in a Mosaic electronic program guide (EPG) service in accordance with preferred embodiments of the present invention will be described in detail with reference to the annexed drawings.

Figure 3:
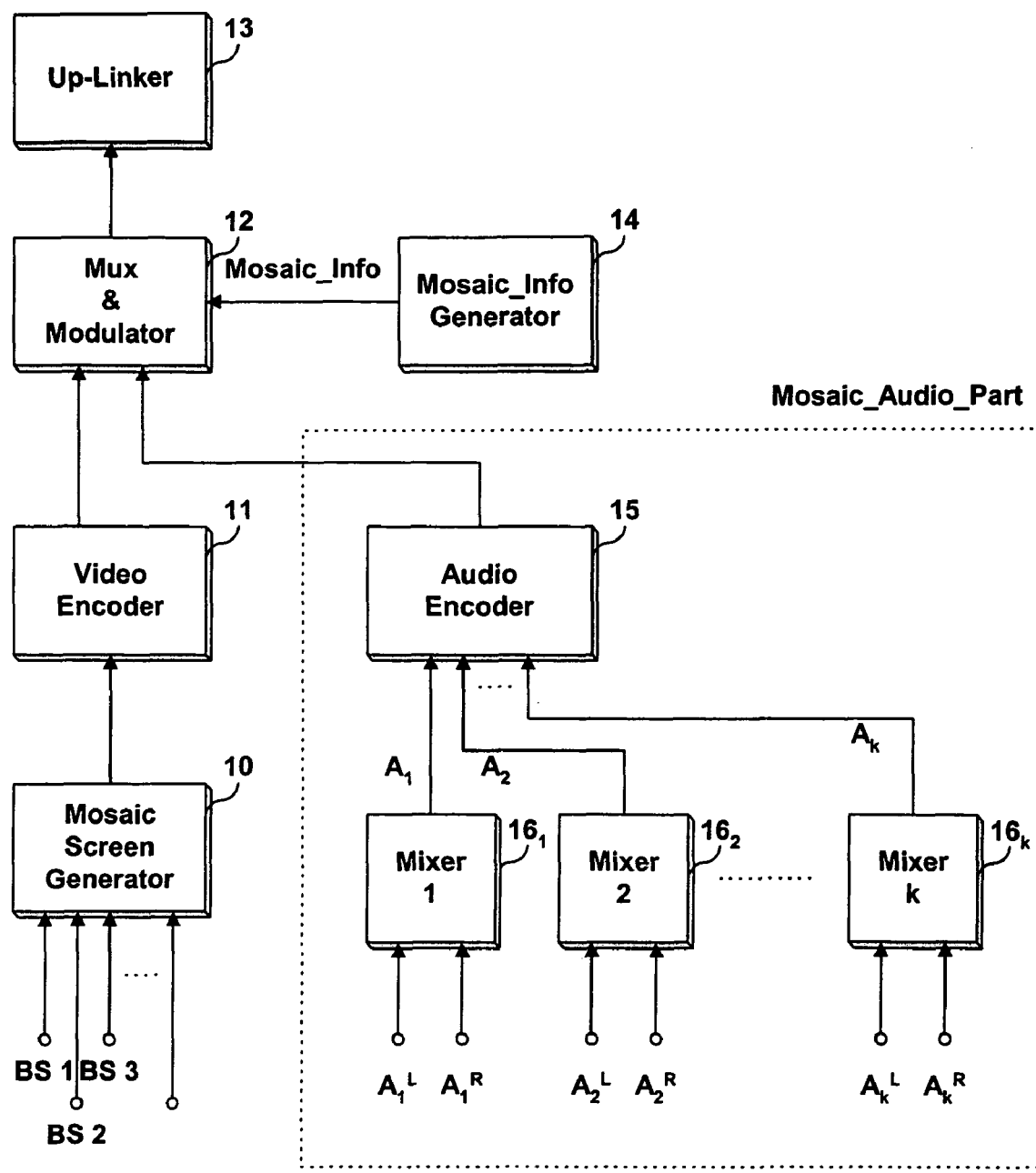
FIG. 3 is a block diagram illustrating the configuration of a transmitting side to which a method for transmitting audio in the Mosaic EPG service is applied in accordance with an embodiment of the present invention.

First, the method for transmitting audio in the Mosaic EPG service in accordance with the present invention is applied to a digital broadcast transmitting side that provides the Mosaic EPG service. As shown in FIG. 3, the transmitting side can comprise a Mosaic screen generator 10, a video encoder 11, a multiplexer (MUX) & modulator 12, an up-linker 13 and a Mosaic information generator 14. The transmitting side can further comprise an audio encoder 15 and a plurality of mixers $16_1$ to $16_k$.

Figure 1:
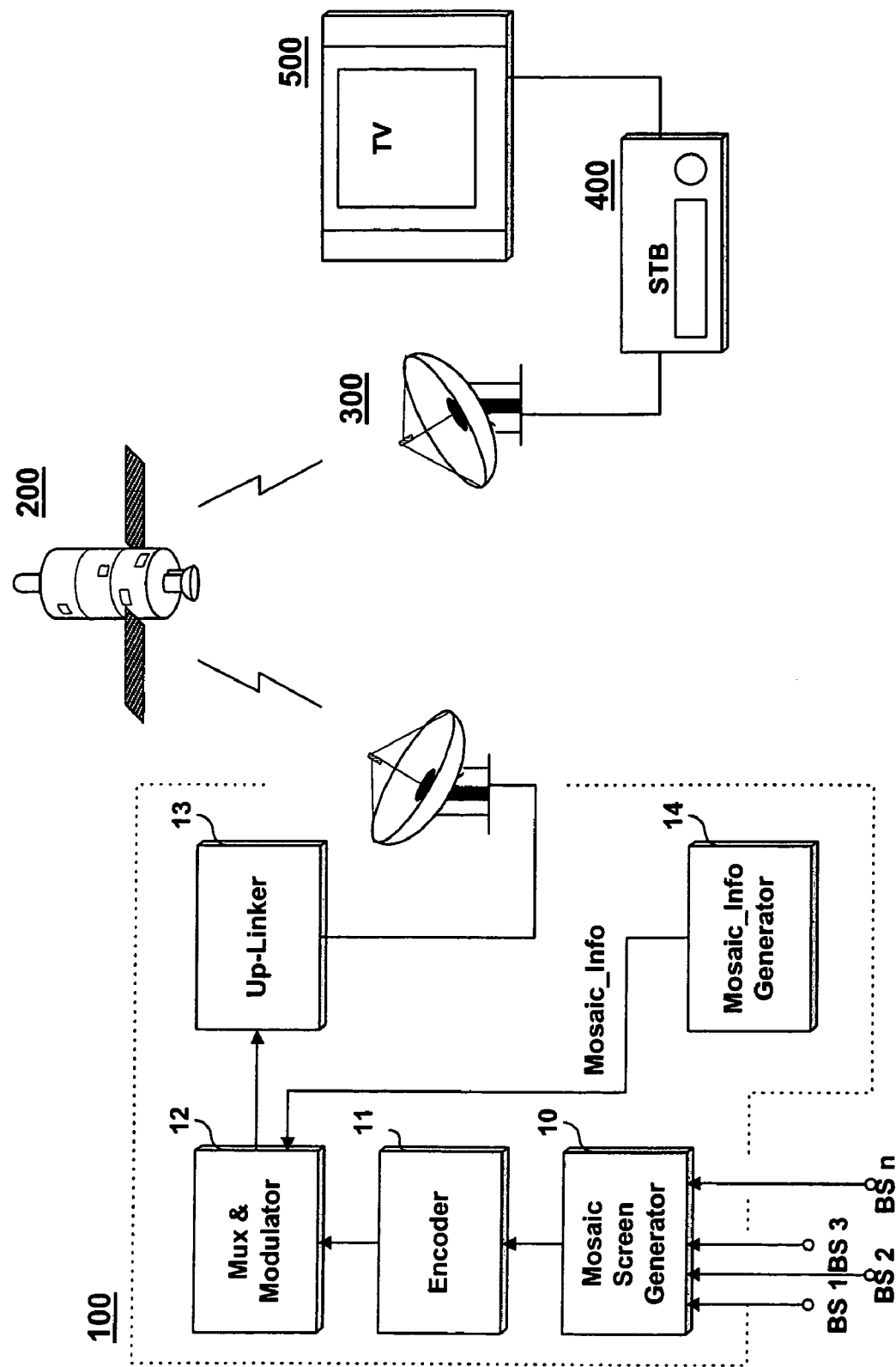
FIG. 1 is a block diagram illustrating transmitting and receiving sides for transmitting and receiving a conventional Mosaic electronic program guide (EPG) service.

As described with reference to FIG. 1, the Mosaic screen generator 10 generates a Mosaic screen so that various broadcast programs BS 1 to BS k currently being broadcast or to be broadcast through different broadcast services can be displayed as small-sized sub-pictures within one screen. The video encoder 11 encodes the Mosaic screen into a video data stream appropriate for digital broadcast.

Moreover, each of the mixers $16_1$ to $16_k$ mixes stereo audio signals of left and right channels corresponding to each sub-picture to generate and output a mono audio signal. For example, the $1^{st}$ mixer $16_1$ mixes $1^{st}$ stereo audio signals $A_1^L$ and $A_1^R$ of the two left and right channels corresponding to the $1^{st}$ sub-picture, and generates and outputs a $1^{st}$ mono audio signal $A_1$. The $2^{nd}$ mixer $16_2$ mixes $2^{nd}$ stereo audio signals $A_2^L$ and $A_2^R$ of the two channels corresponding to the $2^{nd}$ sub-picture, and generates and outputs a $2^{nd}$ mono audio signal $A_2$.

Figure 4:
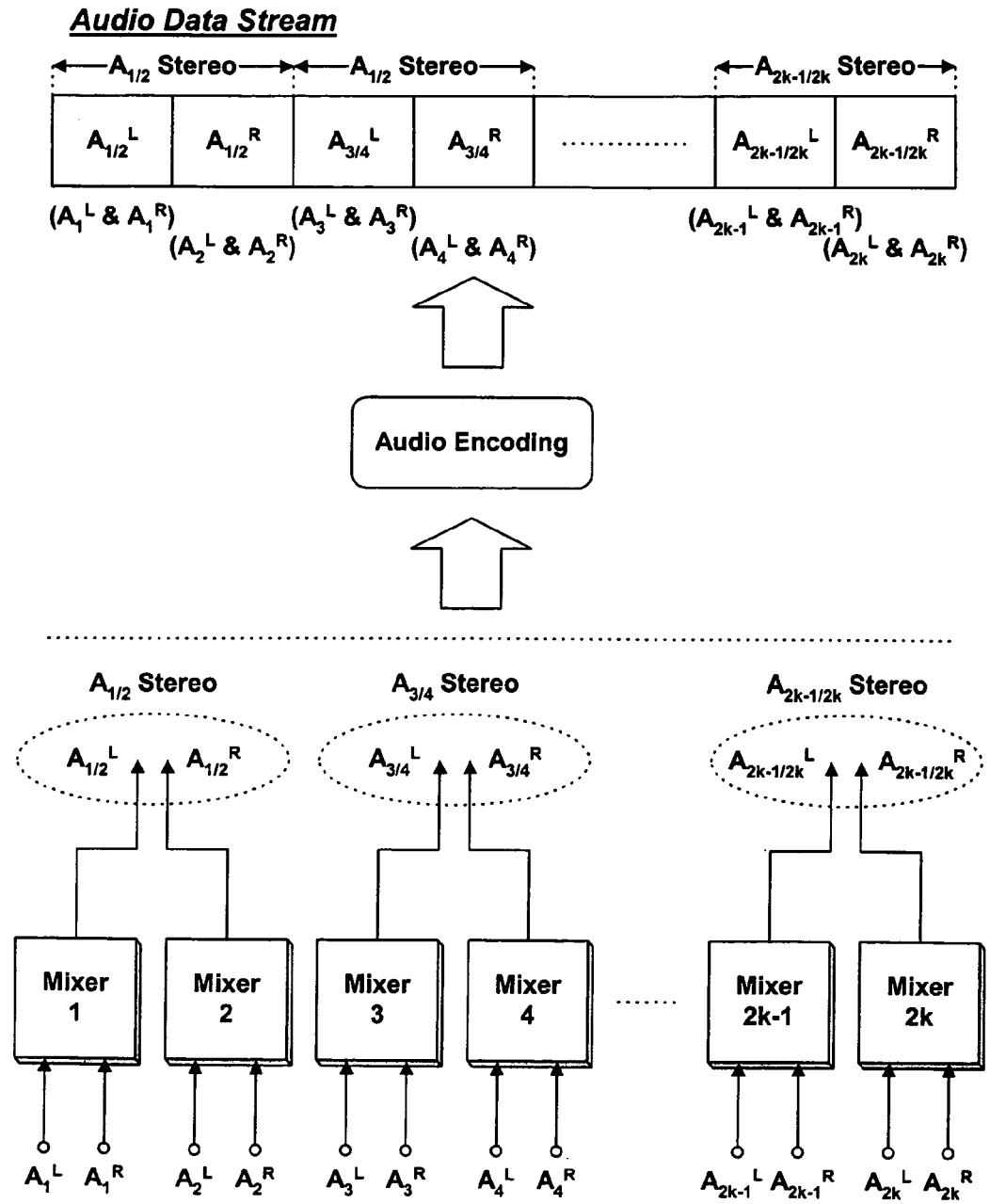
FIG. 4 shows a process for transmitting audio in the Mosaic EPG service in accordance with the present invention.

The audio encoder 15 combines and encodes the $1^{st}$ mono audio signal $A_1$ and the $2^{nd}$ mono audio signal $A_2$ to generate a left-channel audio signal $A_{1/2}^L$ and a right-channel audio signal $A_{1/2}^R$ corresponding to the $1^{st}$ and $2^{nd}$ sub-pictures as shown in FIG. 4. The mono audio signal $A_1$, $A_3$ or etc. corresponding to an odd-numbered sub-picture, i.e., a $(2k-1)^{th}$ sub-picture, and the mono audio signal $A_2$, $A_4$ or etc. corresponding to an even-numbered sub-picture, i.e., a $(2k)^{th}$ sub-picture, are encoded into a left-channel audio signal $A_{2k-1/2k}^L$ and a right-channel audio signal $A_{2k-1/2k}^R$ corresponding to the $(2k-1)^{th}$ and $(2k)^{th}$ sub-pictures.

The MUX & modulator 12 mixes and modulates an audio data stream based on an encoding operation by the audio encoder 15, a video data stream based on an encoding operation by the video encoder 11, and the Mosaic information generated by the Mosaic information generator 14. The MUX & modulator 12 transmits a result of the mixing and modulation to the broadcast satellite 200 via the up-linker 13. At this point, a unique audio packet identification (A_PID) corresponding to the $(2k-1)^{th}$ and $(2k)^{th}$ sub-pictures is additionally recorded on a packet header of the audio data stream.

For example, a unique identification value "PID_$A_{1/2}$" is added to the left-channel audio signal $A_{1/2}^L$ and the right-channel audio signal $A_{1/2}^R$ corresponding to the $1^{st}$ and $2^{nd}$ sub-pictures. A unique identification value "PID_$A_{3/4}$" is added to the left-channel audio signal $A_{3/4}^L$ and the right-channel audio signal $A_{3/4}^R$ corresponding to the $3^{rd}$ and $4^{th}$ sub-pictures.

Program map table (PMT) information of service information (SI) sent through the Mosaic EPG service includes an audio packet ID corresponding to each sub-picture as navigation information so that audio data corresponding to each sub picture can be searched for. That is, the audio packet ID of audio data containing audio linked to each sub-picture is included as the navigation information.

Figure 5:
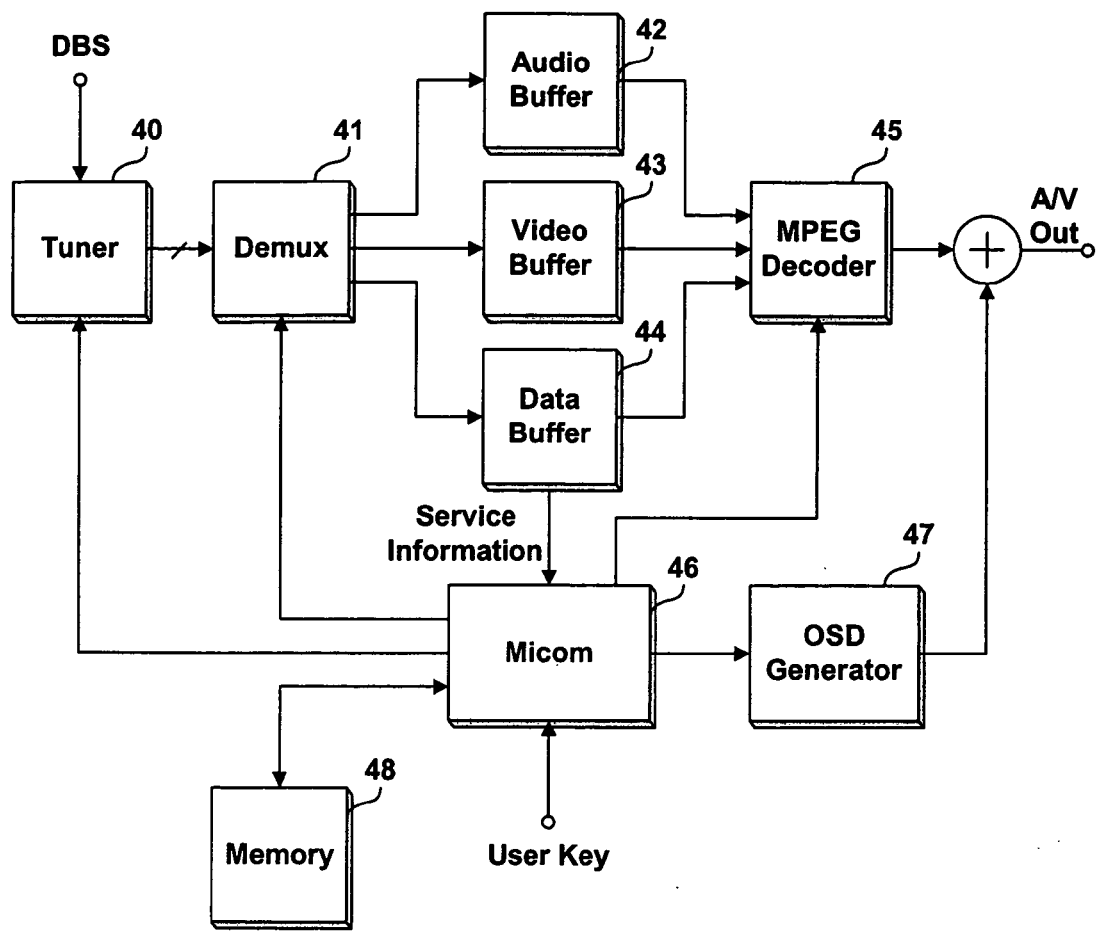
FIG. 5 is a block diagram illustrating the configuration of a receiving side to which a method for receiving audio in the Mosaic EPG service is applied in accordance with the present invention.

A method for receiving audio in the Mosaic EPG service in accordance with the present invention can be applied to the digital broadcast receiver such as the STB. As shown in FIG. 5, the digital broadcast receiver (or STB) 400 comprises: a tuner 40 for tuning a digital broadcast channel; a de-multiplexer (DEMUX) 41 for parsing a Moving Picture Experts Group (MPEG) transport stream received through one arbitrary service of broadcast services multiplexed into the broadcast channel and producing audio, video and data; an audio buffer 42 for temporarily storing the audio; a video buffer 43 for temporarily storing the video; a data buffer 44 for temporarily storing the data; and an MPEG decoder 45 for decoding the temporarily stored audio, video and data and recovering original audio and video signals.

The digital broadcast receiver 400 further comprises: an on screen display (OSD) generator 47 for superimposing and displaying a cursor on a Mosaic EPG picture and outputting a user key input window or an OSD image of a user selection menu; a controller (or microcomputer) 46 for controlling operations of the respective components; and a memory 48 for storing data necessary for controlling the operations of the respective components. The memory 48 stores service information (SI) such as program map table (PMT) information provided through the Mosaic EPG service.

Figure 6:
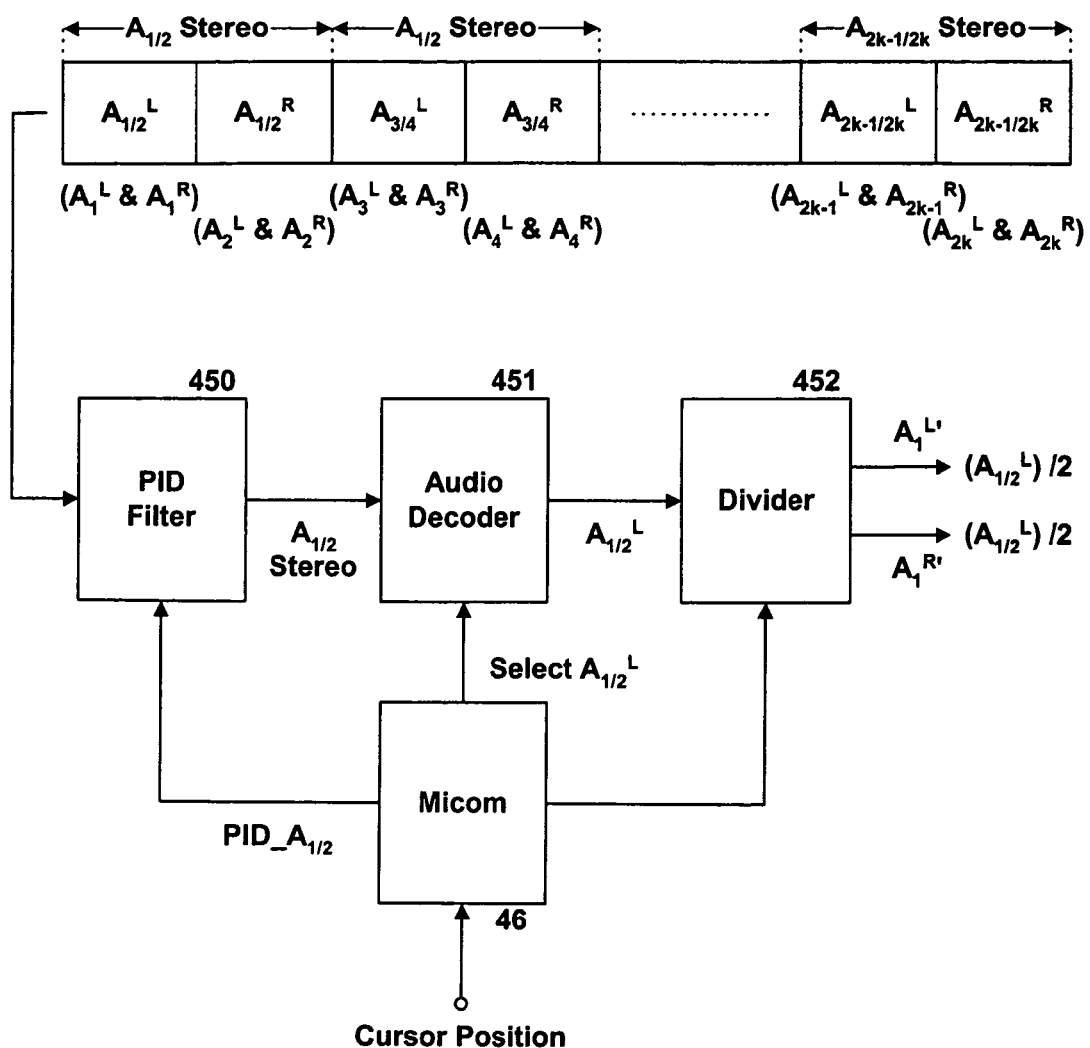
FIG. 6 shows a process for receiving audio in the Mosaic EPG service in accordance with the present invention.

As shown in FIG. 6, the MPEG decoder 45 comprises a packet identification (PID) filter 450, an audio decoder 451 and a divider 452. The PID filter 450 selectively outputs only audio data on which a specific PID is additionally recorded, from the audio data stream inputted through the audio buffer 43.

Figure 2:
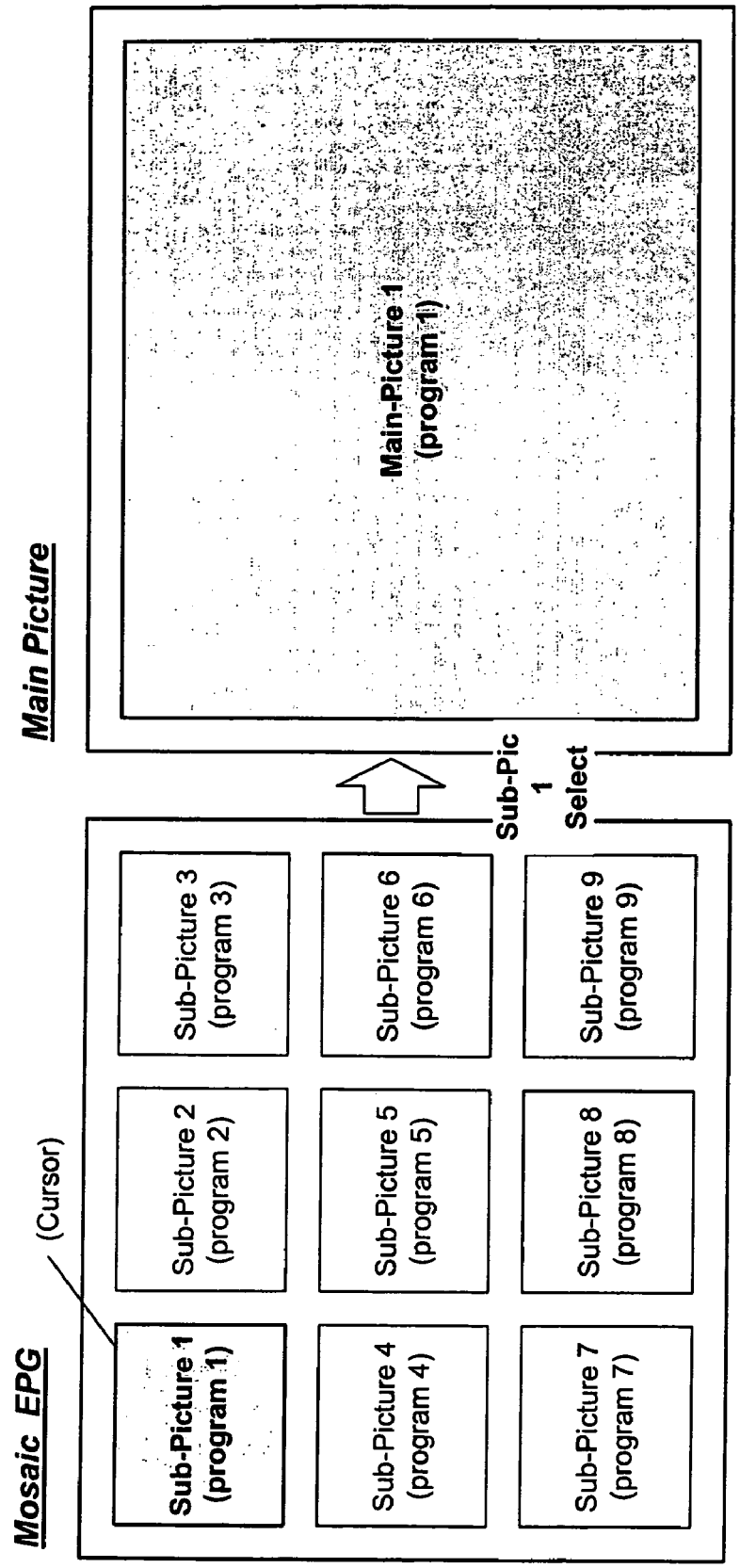
FIG. 2 shows an example of selecting or designating one arbitrary sub-picture from a conventional Mosaic EPG picture.

For example, when the user places the cursor on the $1^{st}$ sub-picture included and displayed within the Mosaic EPG picture as described with reference to FIG. 2, the controller 46 searches for the PMT information stored in the memory 48, confirms an audio PID "PID_$A_{1/2}$" corresponding to the $1^{st}$ sub-picture on which the current cursor is placed, and controls operation of the PID filter 450.

The PID filter 450 selectively outputs only audio data on which the PID is additionally recorded, from an audio data stream inputted through the audio buffer 42. Thus, the audio decoder 451 selectively receives the audio data on which the PID "PID_$A_{1/2}$" is additionally recorded, that is, only stereo audio data $A_{1/2}^L$ and $A_{1/2}^R$ of left and right channels corresponding to the $1^{st}$ and $2^{nd}$ sub-pictures.

Because the $1^{st}$ sub-picture on which the cursor is placed is the $(2k-1)^{th}$ sub-picture, the controller 46 carries out a control operation so that left-channel audio data $A_{1/2}^L$ corresponding to the odd-numbered sub-picture can be decoded among the stereo audio data $A_{1/2}^L$ and $A_{1/2}^R$ of the left and right channels inputted into the audio decoder 451, and a result of the decoding can be outputted.

The divider 452 amplifies the inputted left-channel audio data $A_{1/2}^L$ to a predetermined level after the above-described selection and decoding process, divides a result of the amplification by 2, and outputs the stereo audio signals $(A_{1/2}^L)/2$ of the left and right channels, such that audio signals $A_1^{L'}$ and $A_1^{R'}$ of the left and right channels corresponding to the $1^{st}$ sub-picture on which the cursor is placed are outputted.

Thus, the user can listen to audio corresponding to a sub-picture on which the cursor is placed within the Mosaic EPG picture. Moreover, the digital broadcast transmitting side providing the Mosaic EPG service mixes stereo audio signals corresponding to one sub-picture into a mono audio signal, encodes the mono audio signal of the one sub-picture with another mono audio signal of another sub-picture, and transmits a result of the encoding, such that bandwidth necessary for the audio transmission can be minimized.

When audio of a broadcast program has at least two channels based on a 5.1 channel AC3 system rather than the stereo system, broadcast program audio signals corresponding to the number of audio channels can be encoded into one audio signal. For example, where an audio system is the 5.1 channel AC3 (Audio Coding 3) system, a mono audio signal based on each of the 5 or 6 sub-pictures is generated and 5 or 6 audio signals are encoded into a 5.1 channel, and a result of the encoding can be transmitted.

Moreover, when mono audio signals based on respective sub-pictures are generated, one arbitrary channel can be selected without mixing respective channel audio signals to generate a mono audio signal.

As apparent from the above description, the present invention can efficiently transmit audio of a sub-picture within a Mosaic electronic program guide (EPG) picture.

Moreover, the present invention can minimize bandwidth necessary for transmitting audio of sub-pictures within the Mosaic EPG picture.

In accordance with the present invention, the user can confirm and select a desired broadcast program while listening to audio corresponding to a sub-picture within the Mosaic EPG picture, thereby conveniently using the desired broadcast program.

Although the preferred embodiments of the present invention have been disclosed for illustrative purposes, those skilled in the art will appreciate that various modifications, additions and substitutions are possible, without departing from the scope of the invention.

What is claimed is:

1. A method for transmitting audio in a Mosaic electronic program guide (EPG) service, the method being performed by a device, comprising:
   combining, by a video encoder included in the device, pictures of a plurality of broadcast programs into a Mosaic EPG picture such that the Mosaic EPG picture includes sub-pictures, each sub-picture corresponding to one of the plurality of broadcast programs;
   encoding, by the video encoder included in the device, the Mosaic EPG picture into a video data stream;
   encoding, by an audio encoder included in the device, audio signals of the plurality of broadcast programs into an audio data stream while adding audio packet identifications to the audio data stream, each audio packet identification corresponding to one of the plurality of broadcast programs;
   generating, by a Mosaic information generator included in the device, program map table (PMT) information including the audio packet identifications as navigation information; and
   mixing and transmitting, by a multiplexer (MUX) and a modulator included in the device, the audio stream, the video stream and the program map table (PMT) information,
   wherein a predetermined number of the plurality of sub-pictures within the Mosaic EPG picture are managed as a unit,
   wherein audio channels of each of the broadcast programs and corresponding to the plurality of sub-pictures are changed into mono audio signals,
   wherein mono audio signals belonging to a common unit of sub-pictures are combined into respective multi-channel audio signals,
   wherein multi-channel audio signals are encoded into the audio data stream,
   wherein the predetermined number is determined by an audio system of the plurality of broadcast programs, and
   wherein the audio packet identifications are assigned per unit.

2. The method of claim 1,
   wherein the predetermined number is 2 when the audio system of the plurality of broadcast programs is a 2-channel stereo system, and
   wherein the predetermined number is 5 or 6 when the audio system of the plurality of broadcast programs is a 5.1 channel AC3 (Audio Coding 3) system.

3. The method of claim 2, wherein audio signals of one channel of the audio channels of each of the broadcast programs are selected as the mono audio signals of a corresponding sub-picture.

4. The method of claim 1, wherein audio signals of the audio channels of each of the broadcast programs are mixed to generate the mono audio signals of a corresponding sub-picture.

5. A method for receiving audio in a Mosaic electronic program guide (EPG) service, the method being performed by a device, comprising;
   confirming, by a controller included in the device, an audio packet identification (ID) of a broadcast program corresponding to an arbitrary sub-picture on which a cursor is placed within a Mosaic EPG picture;
   selectively extracting, by a filter included in the device, only audio data that is additionally recorded with the confirmed audio packet ID;
   decoding, by the controller included in the device, the extracted audio data;
   amplifying the decoded audio data to a predetermined level;
   separating partial audio data from the amplified audio data according to a value corresponding to an order of the arbitrary sub-picture and an audio system of the broadcast program; and
   outputting the separated partial audio data,
   wherein a predetermined number of plural sub-pictures within the Mosaic EPG picture are managed as a unit,
   wherein the predetermined number is determined by the audio system, and
   wherein the audio packet ID is assigned to the unit of sub-pictures.

6. The method of claim 5, wherein the step of confirming comprises:
   referring to program map table (PMT) information transmitted through the Mosaic EPG service to confirm the audio packet ID.

7. The method of claim 5, wherein the step of separating comprises:
   when the audio system of the broadcast program is a 2-channel stereo system, separating and outputting left-channel audio data from the decoded audio data if the arbitrary sub-picture is an odd-numbered sub-picture; and
   separating and outputting right-channel audio data from the decoded audio data if the arbitrary sub-picture is an even-numbered sub-picture.

* * * * *